United States Patent [19]
King

[11] 3,857,989
[45] Dec. 31, 1974

[54] METHOD AND APPARATUS FOR PREPARING AN ANIMAL FOOD PRODUCT

[75] Inventor: David P. King, Erie, Mich.
[73] Assignee: King-Bartolotta, Inc., Erie, Mich.
[22] Filed: Sept. 27, 1973
[21] Appl. No.: 401,546

[52] U.S. Cl.................. 426/518, 425/382, 426/371
[51] Int. Cl............................................. A22c 17/00
[58] Field of Search ........... 426/518, 149, 167, 224, 426/350, 371, 376, 382; 425/376, 382, 464; 241/83, 84, 95, 284

[56] References Cited
UNITED STATES PATENTS
3,611,951   10/1971   Sloan ................................ 425/382

Primary Examiner—A. Louis Monacell
Assistant Examiner—R. A. Yoncoskie
Attorney, Agent, or Firm—Owen & Owen

[57] ABSTRACT

A method and apparatus for preparing an animal food product are disclosed. The apparatus comprises a chamber having a plunger therein. The plunger is connected to a press for movement toward extractor plates within the path of the plunger. The product is prepared by placing a dressed animal mass within the chamber and advancing the plunger toward the extractor plates. The animal flesh and bones are extruded through the extractor plates under pressure to form a homogeneous product.

10 Claims, 7 Drawing Figures

PATENTED DEC 31 1974
3,857,989
SHEET 1 OF 2
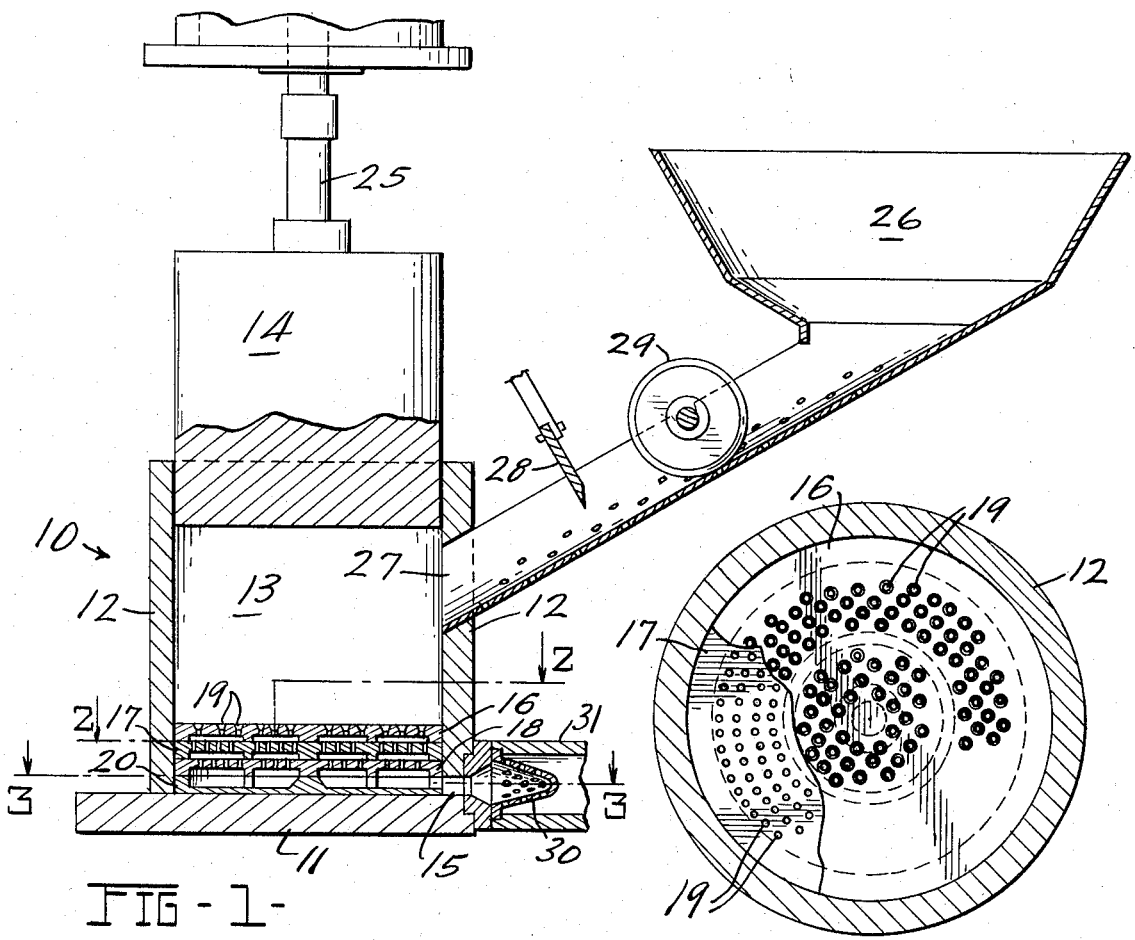
FIG-1-
FIG-2-
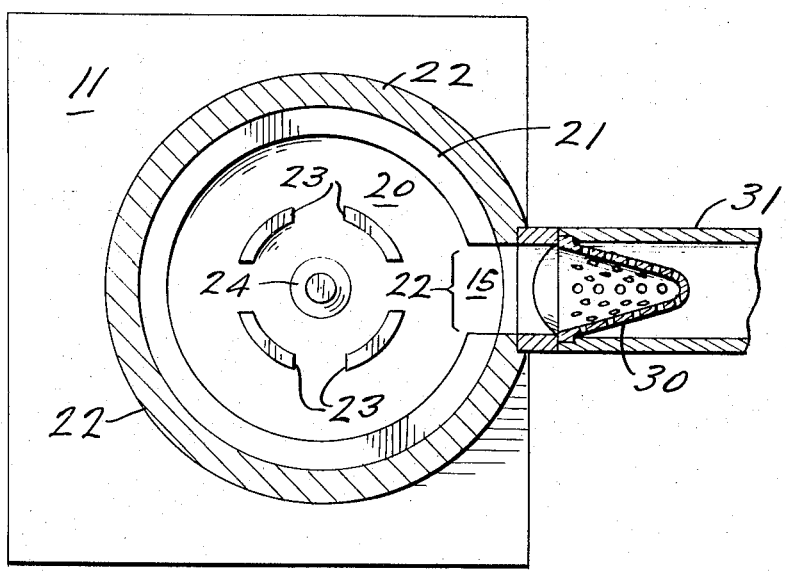
FIG-3-

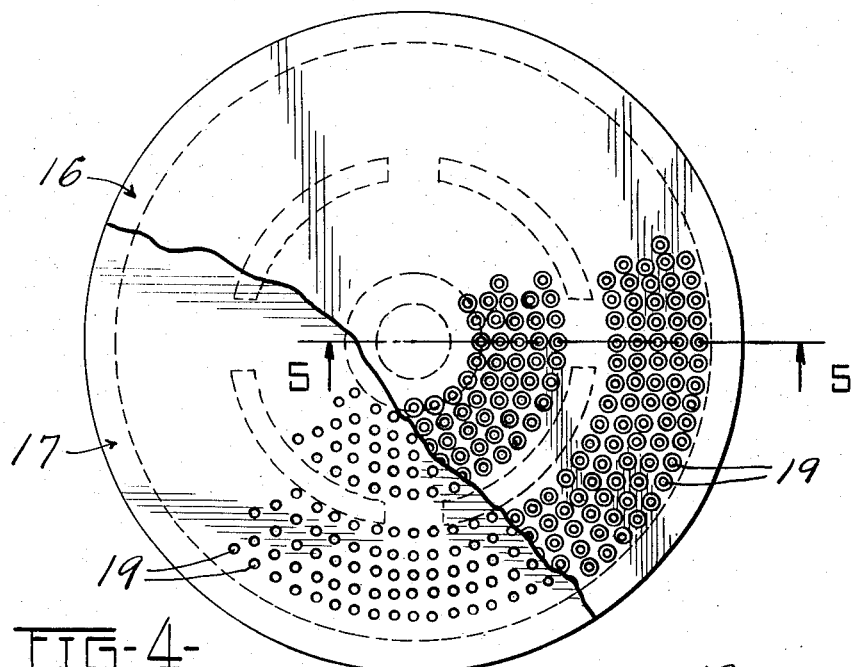
FIG-4-
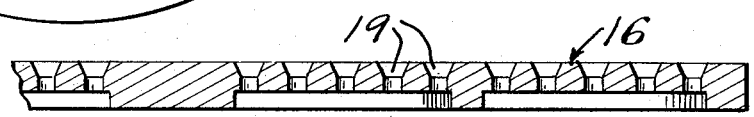
FIG-5-
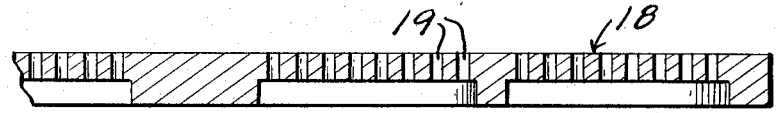
FIG-6-
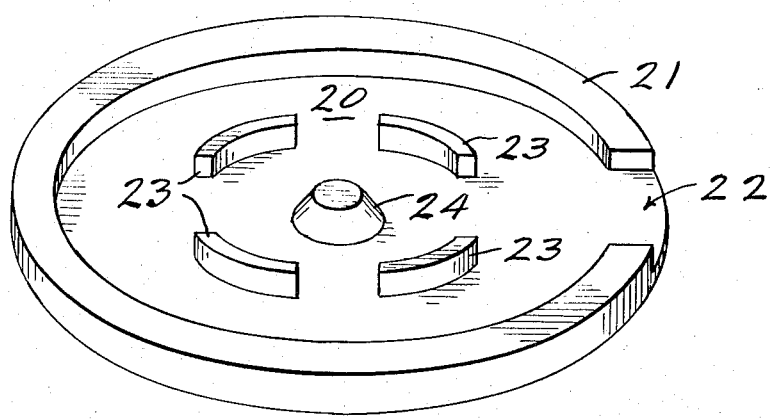
FIG-7-

3,857,989

1

METHOD AND APPARATUS FOR PREPARING AN ANIMAL FOOD PRODUCT

BACKGROUND OF THE INVENTION

The present invention relates to a method and apparatus for manufacturing a food product of high nutritional value. The product can be used as a basic source for prepared meat products such as, for examples, hot dogs, bologna, prepared packaged foods requiring meat-protein content and sausage. It can also be cooked in any conventional manner (for example by forming the product into patties and frying) without any processing beyond the initial process steps of the present invention.

Broadly, the invention comprises the extrusion of animal flesh and bones under high pressure through a series of orificed plates. The resultant extruded product comprises a semi-liquefied mass having a uniform consistency, color and texture; the bone matter of the animal mass being indistinguishable from the remainder of the product.

Significantly, the invention is particularly useful upon animals such as "trash fish" which are generally considered to have no edible or commercial value. Fish such as carp, suckers, alewives and Chesapeake Bay white perch have been processed in accordance with the present invention and then used as a beef, veal or pork substitute to produce link sausage, hot dogs, bologna and salami. The flavor texture, color and odor of the finished products are non-distinguishable from conventionally prepared packaged meats.

In contrast to conventionally prepared packaged meats currently marketed in the United States, meats prepared using the product of the present invention are of high food value — containing the entire bone-and-flesh animal structure with no chemical fillers, added water or fat.

In this regard, it is believed that the present invention provides an animal protein source which could significantly improve the food value of such popular processed foods as hot dogs and bologna — which under current Federal Government regulatory standards may contain up to 30 percent fat, 10 percent added water and 3½ percent extenders or binders, seasonings, and curing agents. (Code of Federal Regulations, title 9, part 319) Furthermore, typical hot dogs or bologna products currently consist of 12 percent protein, 28 percent fat, 56 percent water and 4 percent chemical additives. (Testimony of Jack C. Leighty, U.S. DEPT. of AGR., at USDA Hearings, June 18, 1969). The product processed in accordance with the present invention, however, has been found to contain, by analysis, 18.28 percent protein and 9.4 percent fat.

The primary incentive for manufacturing such low quality process meats is the relative expense and scarcity of beef and pork which comprises the conventional meat source for these packaged foods. The present invention, however, provides a means for changing currently valueless and over-abundant fish into a useable protein source. It has been found, for example, that Chesapeake Bay white perch provide an excellent animal source for manufacturing the product of the present invention. These white perch have little commercial value and are at present in a state of overpopulation which threatens to upset the ecological balance of the Bay region.

2

Chesapeak Bay white perch processsed under the method of the present invention form a highly suitable base for the manufacture of fish patties. The resultant product achieved using the white perch have no objectionable "fishy" odor. They can therefore be cooked in any conventional manner or processed as a base for a large variety of meat products.

Because the animal source most useful for processing in accordance with the present invention is cheap and plentiful, there is no economic incentive for processors to dilute processed meats — such as hot dogs — with water, fat and fillers. For this reason, hot dogs made with the product of the present invention can consist of a full animal source of high nutritive value and yet be placed on the retail market at an extremely low price.

SUMMARY OF THE INVENTION

The invention comprises a method and apparatus for manufacturing a food product. The apparatus comprises a chamber defining an opening comprising an inlet for receiving dressed animal matter therein. A plunger is movable aixally within the chamber from a point adjacent the inlet toward and outlet end of the chamber. Extractor plates located adjacent the outlet end define a series of orifices of determinate size. A press is connected to the plunger to effect movement under pressure toward the extractor plates. The method comprises placing dressed animal matter within the inlet, and advancing the plunger against the animal to effect movement toward the extractor plates. The plunger is advanced under sufficient pressure to extrude the animal flesh and bones through the extractor plates to form a homogeneous product. The product comprises a semi-liquefied mass having a homogeneous consistency — the bones being indistinguishable from the remainder thereof. An amount of the bone matter is transformed into a gelatinous substance under pressure to form a bonding agent, rendering the product formable into desired products.

BRIEF DESCRIPTION OF THE DRAWINGS

FIG. 1 is an elevational, partially cross-sectional view of the apparatus of the present invention;

FIG. 2 is a top view of the apparatus of the present invention taken along line 2—2 of FIG. 1;

FIG. 3 is a cross-sectional, top view of the present invention taken along line 3—3 of FIG. 1;

FIG. 4 is a top view of extractor plates comprising the present invention with a part of the top extractor plate broken away;

FIG. 5 is a sectional view of one of the extractor plates of the present invention taken along the line 5—5 of FIG. 4;

FIG. 6 is a sectional view similar to FIG. 5 of a third extractor plate; and

FIG. 7 is a perspective view of a base plate of the apparatus comprising the present invention.

DESCRIPTION OF THE PREFERRED EMBODIMENT

Referring to FIG. 1, an apparatus 10 for processing a food product is shown. The apparatus 10 comprises a base 11 having a cylindrically shaped chamber 12—12 connected to the base 11. The chamber 12—12 defines an opening 13 for receiving an animal within the chamber 12—12. A plunger 14 is within the chamber 12—12 and is movable from a point superadjacent the opening 13 toward an outlet 15 which is best seen in FIG. 3. A series of extractor plates are stacked, one upon the other, across the bottom of the chamber 12—12 in the path of the plunger 14. A top extractor plate 16 is shown partially cut away in FIG. 4; a center extractor plate 17 is shown in FIG. 5 and a bottom extractor plate 18 is shown in FIG. 6. The extractor plates 16, 17 and 18 comprise flat discs having series of axially extending bores 19 therein. Because the discs are placed under high pressure, as will be discussed below, it is preferable to form them from hardened steel capable of withstanding pressures up to, for example, 300,000 psi. The axial bores 19 are arranged in radial patterns expanding from the center of the discs 16, 17 and 18 toward their outer periphery as can best be seen in FIGS. 2 and 4.

The bores 19 are of sufficiently small size to effect a disintegration of animal flesh and bone material body placed in the chamber, as will be explained below. It has been found that a preferable bore diameter for plates 16 and 17 ranges between one-fourth to five-sixteenths of an inch at a top side of the disc and tapering down to a range of one-eighth to one-sixteenth of an inch at a bottom side of the disc. The bores of disc 18 are preferably 0.045 inches in diameter and are not tapered.

An outlet base plate 20 is connected subadjacent the stacked discs 16, 17 and 18 to form a closure for an end of the chamber 12—12 opposite the plunger 14. The base plate 20 comprises a hardened metal disc having a relieved rim 21 about the periphery of the disc. An outlet notch 22 is cut in the relieved rim 21 to permit a finished extruded product to exit the chamber 12—12 therethrough. Guide spacers 23 are located circumferentially around an axial post 24 for directing the extruded product radially between the spacers toward the rim 21. The product is then forced, by pressure of the plunger, around the inside of the rim 21 toward the outlet notch 22 where it exits the chamber 11.

Referring to FIG. 1, the plunger 14 is connected by means of a drive rod 25 to a hydraulic press apparatus (not shown). The press may be of any conventional type, capable of exerting a pressure of preferably 300,000 psi and must be capable of moving the plunger 14 within the chamber 12—12 from an inlet position above the opening 13 to a point adjacent the stacked extractor plates 16, 17 and 18.

A receiving hopper 26 is in communication, through a chute 27, with the opening 13. A driven chopper 28 and a rotary slicer 29 are in the path of the chute 24 for preslicing dressed fish placed in the hopper to assure uniform loading of the chamber 12—12 as will be discussed below.

In operation, the hopper is filled with fish which are preferably dressed. That is, the scales, fins and entrails of the fish are removed to assure that the end product will be contaminate free and homogeneous. The dressed fish move, by gravity, down the chute 27 against the rotary slicer 29 and than against the driven chopper 28 where they are cut into coarsely sized pieces.

The press apparatus is actuated to raise the plunger 14 to its inlet position above the opening 13. The chopped fish is then free to move down the chute 27 through the opening 13 and into the chamber 12—12. When the chamber 12—12 fills, the fish still in the chute are blocked against further movement toward the opening 13. The press is then actuated to advance the plunger 14 against the fish flesh and bones in the chamber toward the first extractor plate 16 under a pressure of not less than 120,000 psi.

As the plunger advances, the flesh and bones of the fish are pressed through the bores 19 of the first extractor plates 16. As is best seen in FIG. 1, the pattern of the bores 19 in the extractor plates 16, 17 and 18 are arranged in such a manner that the bores 19 of the adjoining plates 16, 17 and 18 are not in complete registry. Thus as the flesh and bones are extruded through the bores 19 of the first extractor plate 16 they are forced radially under pressure along a top surface of the second extractor plate 17 before moving axially through a bore 19 in plate 17. After the flesh and bone are forced through plate 17, the product follows a like path through the third extractor plate 18. The flesh and bones are thus extruded through the orifices 19 of the extractor plates 16, 17 and 18 in a tortuous path until they reach the base plate 20. The combination of very high pressure, small size of the bores 19, and the tortuous path which the flesh and bone matter follows through the plate series, cause the flesh and bones of the fish to be disintegrated into a semi-liquid mass.

The mass is then directed toward and through outlet 15 by the configured base plate 20 as described above.

A strainer 30 is located adjacent the outlet notch 22 for final straining of the extruded product before it exits the chamber 12—12. An outlet tube 31 is connected over the strainer and leads to a holding tank (not shown). The product is strained and transferred to the tank to await further processing to form desired meat products.

It has been found that the bones of most fish tested in the apparatus become gelatinous in texture and disintegrate to the extent that they become indistinguishable from the remainder of the extruded product. It has also been found that the extruded product is essentially deodorized, having virtually no fish odor. It is believed that the extremely high pressure alters the structure of the fish body significantly enough to eliminate odor and at the same time provide an extruded product which is readily formable into various meat products.

Once the plunger 14 reaches the end of its extruding stroke, it is retracted to its inlet point above the opening 13, whereupon fish in the chute again proceed by gravity into the chamber 12—12. The press is then again actuated to initiate the extruding process. Means are thus provided for continuously processing the dressed fish into the finished product of the present invention.

It is understood that the above description discloses one preferred embodiment of my method and process invention and that other embodiments may be devised without departing from the scope and spirit of the following claims.

What I claim is:

1. A method of preparing an animal food product comprising the steps of:
   1. placing a mass animal flesh and bone material within a chamber between a plunger, axially movable within said chamber and perforated extractor means adjacent an outlet end of said chamber;
   2. advancing said plunger against the mass under a pressure of not less than 120,000 psi to force the flesh and bones of the mass through said perforated extractor means to reduce the bones to a size and consistency indistinguishable from the remainder of the resultant food product which emerges from said extractor plates; and 3. collecting the resultant food product from said outlet end of said chamber.

2. A method of preparing an animal food product according to claim 1 further comprising the step of straining the resultant food product after it emerges from said extractor means.

3. The method of preparing an animal food product according to claim 1 further comprising the step of precutting the mass prior to introduction into said chamber to assure uniform filling of said chamber.

4. A method of preparing an animal food product comprising the steps of:
1. placing a mass of animal flesh and bones within a chamber having press means therein for moving the flesh and bones of the animal through orificed extractor means defining a series of perforations which define a tortuous path through said extractor means;
2. advancing said press means against the animal to extrude flesh and bones thereof through said said tortuous path under sufficient pressure to effect a disintegration of the flesh and bones into a homogeneous product, the bones being reduced to an indistinguishable gelatinous substance which forms a binder to maintain said product in desired shapes.

5. A method of preparing a fish product comprising the steps of introducing a mass of fish flesh and bone material into a chamber; forcing the mass under pressure through a a series of perforations which define a tortuous path, said perforations defining an area significantly smaller than the area of said chamber to extrude the flesh and bone material into a homogeneous product, said pressure being of sufficient magnitude to transform substantially all of the bone material into a gelatinous substance within the product, and removing the product from said chamber.

6. An apparatus for preparing an animal food product comprising a chamber, a plunger axially movable within said chamber from an inlet end and toward an outlet end of said chamber, extractor means comprising stationary, stacked discs located axially within said chamber within the path of said plunger, said discs having perforations therein of determinant size and being arranged with respect to one another to define a tortuous path through said perforations and means for moving said plunger under a pressure of not less than 120,000 psi toward said outlet end, whereby animal flesh and bone material introduced into said chamber forced through said tortuous path.

7. An apparatus for preparing an animal food product according to claim 6 wherein said perforations in said discs are no larger than one-eighth inch in diameter on an outlet side of said discs.

8. An apparatus for preparing an animal food product according to claim 6 further comprising a chute for continuously feeding animal material toward said opening.

9. An apparatus for preparing an animal food product according to claim 8 further comprising cutting means adjacent said chute for cutting the animals prior to entering said chamber.

10. An apparatus for preparing an animal food product according to claim 6 further comprising straining means adjacent said outlet.

* * * * *